Dec. 6, 1960
G. B. MORSE
2,963,057
MULTI-PURPOSE MACHINE TOOL WITH
VARIABLE SPINDLE POSITION
Filed May 7, 1958
3 Sheets-Sheet 3
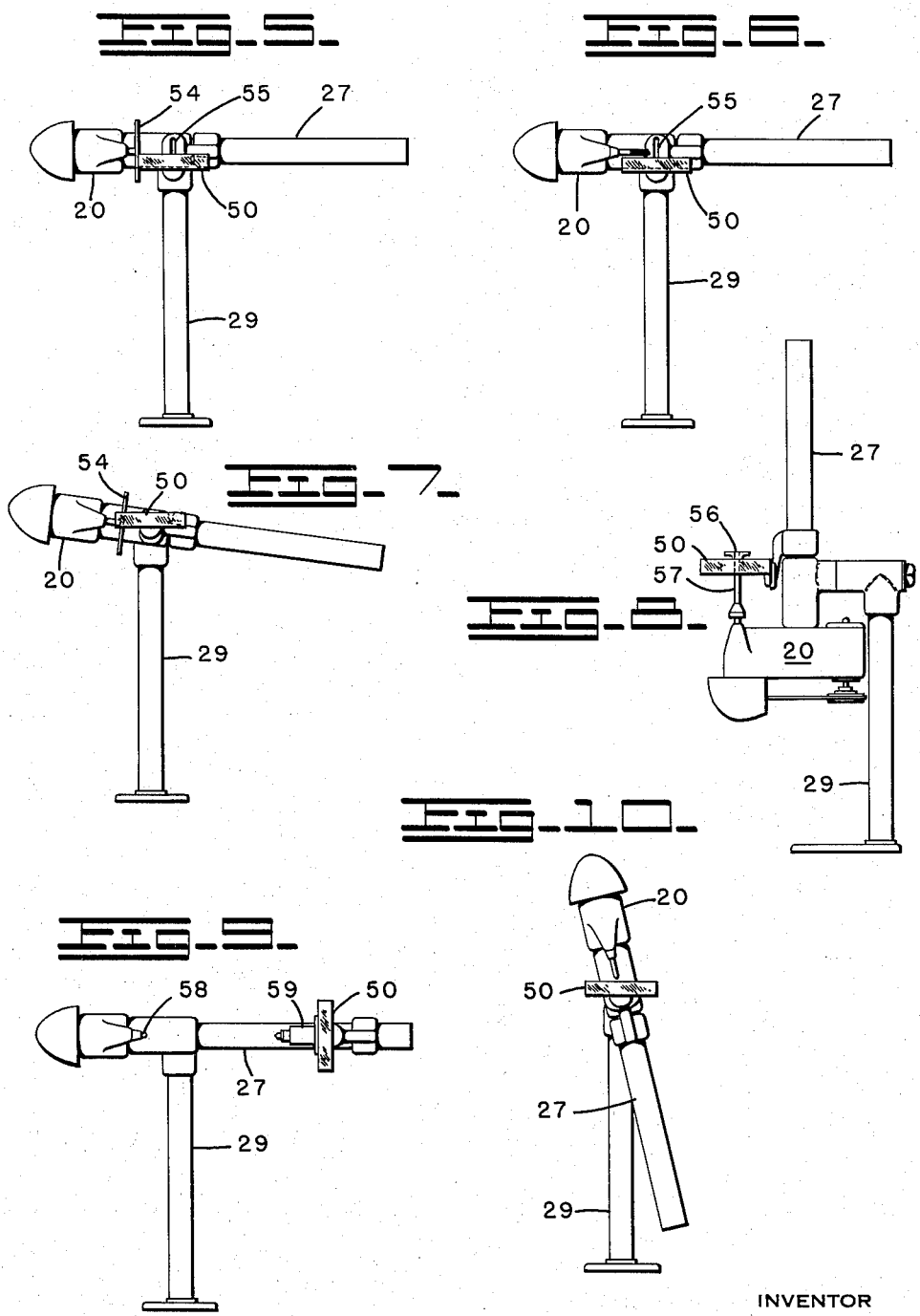
INVENTOR
ATTORNEY United States Patent Office
2,963,057
Patented Dec. 6, 1960

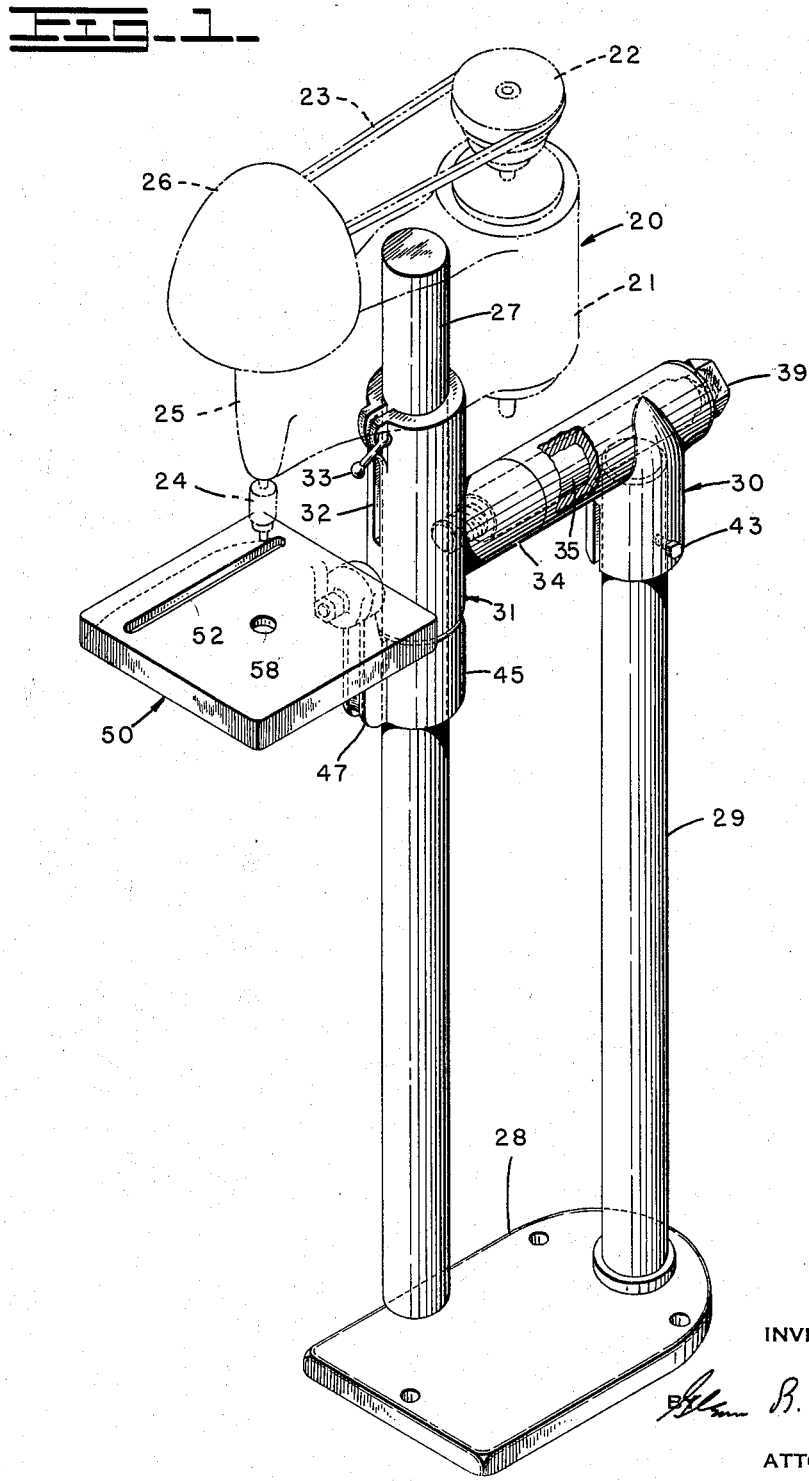

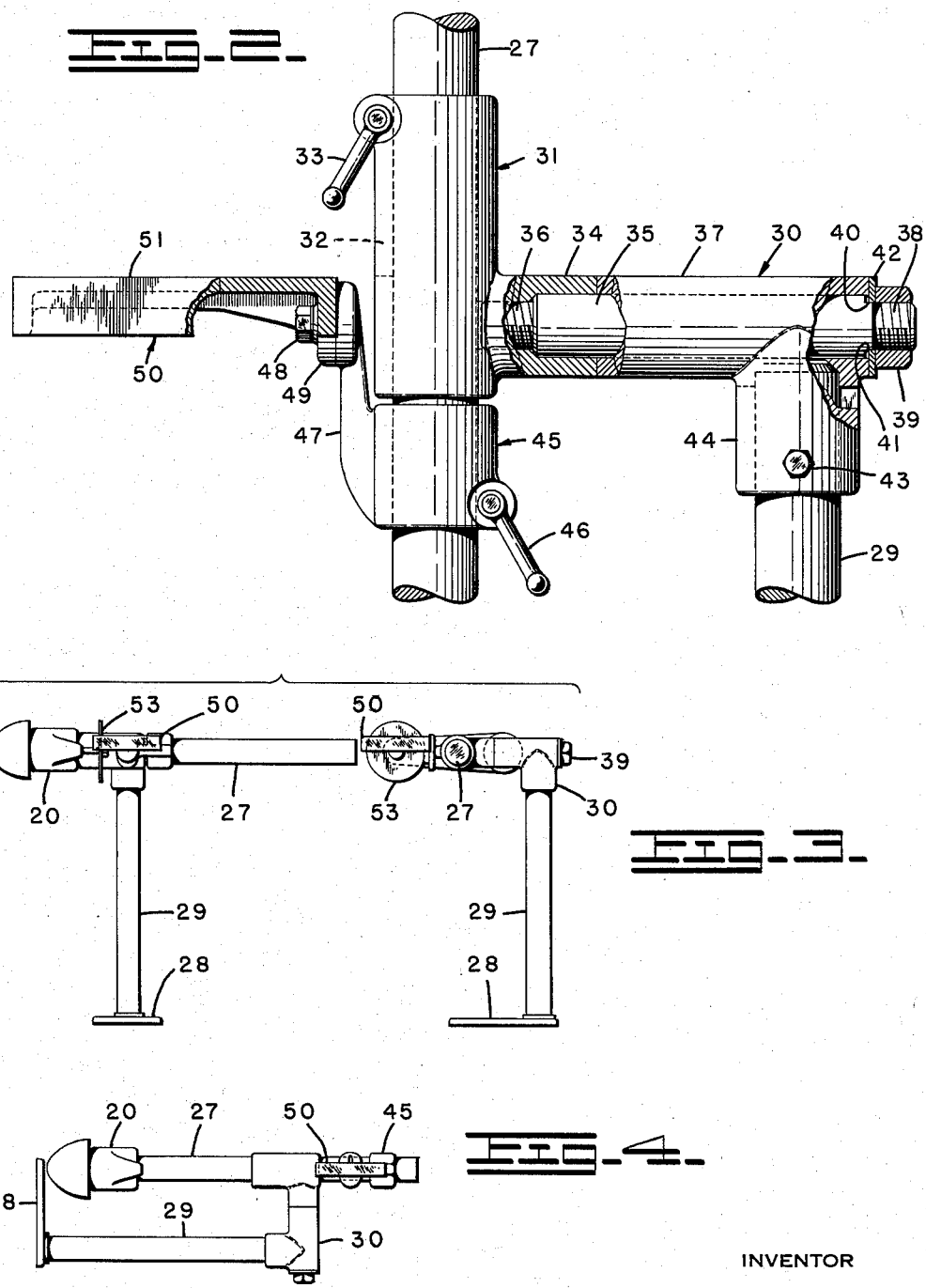

2,963,057

MULTI-PURPOSE MACHINE TOOL WITH VARIABLE SPINDLE POSITION

Glenn B. Morse, Rte. 3, Grand Rapids, Mich.

Filed May 7, 1958, Ser. No. 733,655

7 Claims. (Cl. 144—1)

This invention relates to the construction of multi-purpose machine tools. In the preferred form, many of the components of a standard drill press are utilized without substantial alteration. The additional elements are simple in construction and inexpensive to manufacture, and the small increase in cost of the universal machine over that of the usual drill press is insignificant when the vast increase in utility is considered.

The invention is directed primarily to the needs and limitations of the home workshop. Here, maximum efficiency of operation and high production speed are of secondary importance. Floor space is normally at a premium, and the more operations that can be performed by machinery operating within a given area, the more desirable is the equipment. Most of the work performed in a home workshop is in the nature of hobby activity, or possibly the construction of experimental models, and it is always questionable whether or not the investment in a large number of specialized machine tools is justified. This is particularly true in the case of the man who is beginning his acquisition of equipment, and wishes to obtain as much flexibility as possible for each unit he purchases. Much pleasure is usually associated with his work, an the time required to make adjustments to the machinery to adapt it from one operation to another normally gives rise to no objection. Many beginners in home-workshop activity are relatively unfamiliar with the operations of single purpose equipment, and do not realize the advantages to which it may be put. A flexible multi-purpose machine will serve to acquaint the workman with what can be accomplished, and lead him into a more intelligent investment in equipment as his interests specialize and as his financial ability to acquire machinery increases.

The present invention makes it possible to combine in one machine the functions of a drill press, a router or shaper, a lathe, a horizontal boring machine, a disc sander, a circular saw, and numerous other functions. Additionally, the flexibility of the machine makes it possible to place it in a comparatively compact position for shipment and storage without completely disassembling it.

If an analysis be made of many of the basic characteristics of machine tools, it will be found that much of the difference between them is in the attitude of the rotary operating spindle with respect to the worktable. Operations such as routing, drilling, and flexible-disc sanding are performed with the axis of the spindle substantially perpendicular to the work surface. A circular saw, a horizontal boring machine, and other similar forms of equipment operate with the spindle axis parallel to the plane of the table surface. In this invention, an arrangement is provided for altering the relationship of the spindle axis with respect to the plane of the worktable, with this adjustability giving an infinite variability which makes possible the machining of a workpiece at any desired angle with respect to the surface on which it is supported. Several subordinate features are also provided by this invention which contribute to the full utilization of this general principle. These general features will be discussed in further detail through an analysis of the particular embodiments illustrated in the accompanying drawings. In the drawings:

Figure 1 presents a perspective view of a machine embodying this invention, with the power head being that of a conventional drill press, and shown in dotted lines.

Figure 2 presents a side elevation of the pivot structure of the machine shown in Figure 1.

Figure 3 shows a front and side elevation of the machine shown in Figure 1 when adjusted to provide the functions of a circular saw.

Figure 4 illustrates the compact shipping form in which the machine can be placed without disassembly.

Figure 5 presents a front elevation of the machine arranged to perform the functions of a disc sander.

Figure 6 shows the same machine arranged as a horizontal boring machine.

Figure 7 illustrates an intermediate position in which a saw cut (with the machine set as a circular saw) can be made at an angle other than perpendicular with respect to the worktable.

Figure 8 illustrates the adjustment of the machine for use as a router or shaper.

Figure 9 shows the arrangement of the machine for performing the function of a wood lathe.

Figure 10 shows the adjustment of the machine for drilling holes at an angle other than 90° to the worktable.

Referring to the drawings, the illustrated machine utilizes a conventional drill press power head generally indicated at 20, and shown in dotted lines in Figure 1. This power head normally includes a motor 21, a drive pulley 22, a V-belt 23, and a spindle assembly terminating in a chuck 24. The spindle is normally journaled in bearings mounted in the portion 25 of the powerhead, and a shield 26 serves as a protection to the worker against possible belt breakage, or against the throwing of oil from the spindle assembly. The power head is mounted upon the upper portion of the beam 27, and is normally fixed with respect thereto. In the case of the conventional drill press, this shaft is provided at its lower end with a base resting firmly on the floor. In the illustrated machine, a base of identical design indicated at 28 stabilizes the fixed vertical column 29 provided at its upper extremity with the fulcrum fitting 30. The beam 27 is received within a collar 31 having a split section at the upper end defined by the slot 32, with the bolt 33 being provided to generate a constricting action capable of clamping the collar firmly around the beam 27 to prevent relative movement. Prior to the tightening of the bolt 33, the shaft could be rotated within the collar, and also moved axially.

The collar 31 is provided with a lateral extension 34 having an internal bore for receiving the stub shaft 35. The inner end 36 of the shaft 35 is threaded, and engages a similarly threaded portion of the bore of the extension 34. The shaft 35 is normally screwed solidly into engagement with the extension 34 to form a normally fixed connection. The shaft 35 extends through the horizontal upper portion 37 of the fulcrum member 30 in freely rotating relationship. The outer end 38 of the shaft is threaded to receive the nut 39, and a pair of diametrically opposite flats 40 and 41 (refer to Figure 2) are closely engaged by a similarly-formed opening in the washer 42. This washer bears upon the end of the upper section 37 of the fulcrum member, and tightening of the nut generates a clamping action creating a resistance to rotation of the collar 31 and shaft 35 with respect to the vertical column 39. The engagement of the washer 42 in non-rotative relationship with the shaft 35 as a result of the flats 40 and 41 removes any tendency for rotation of the shaft to loosen the nut 39. The fulcrum member 30 may be considered as fixed with respect to the column 29 as a result of the action of the bolt 43 as it engages both the lower portion 44 of the fulcrum member and the wall of the column 29. If desired, the bolt 43 may extend through the assembly and be engaged by a nut on the opposite side to create a clamping action tending to further increase the rigidity of the mounting.

A bracket 45 is slidably received on the beam 27 on the opposite side of the collar 31 from the power head 20. This bracket is also preferably slotted on its inner side, with the bolt 46 being capable of generating a constricting action so as to lock the axial and rotary position of the bracket with respect to the beam 27. An offset member 47 is preferably formed integrally with the bracket 45, and has the function of bringing the worktable closer to the power head by reaching around the collar 31. A bolt 48 extends through the flange 49 of the worktable 50, which is preferably free to rotate with respect to the bracket 45 until the bolt is tightened. The bolt 48 has threaded engagement with the upper end of the offset member 47, and tightening of the bolt 48 will fix the angular relationship of the worktable 50 with respect to the axis of the beam 27. The plane of the top surface 51 is normally disposed at a substantial distance above the axis of the bolt 48, and therefore above the axis of the pivotal mounting of the worktable with respect to the beam 27. The amount of this displacement can be selected at will, and can be established at an amount sufficient to place the plane of the surface 51 in a position above the entirety of the machine when the horizontal arrangement illustrated in Figure 3 is used. This feature becomes valuable whenever it is desired to utilize a circular saw operation on large sheets of plywood, long boards, or in any other operations where horizontal clearance over considerable distances is valuable.

It should be noted that the rotatability of the power head and beam 27 within the collar 31 provides for the shift of the spindle axis in a vertical direction with respect to the worktable when the machine is in the horizontal position shown in Figures 3, 5, 6, 7, and 9. The worktable 50 is provided with a slot 52 through which a circular saw blade 53 may project, with the amount of projection being determined by the position of the axis of the spindle with respect to the worktable as outlined above. The axial adjustability of the beam 27 within the collar 31 permits the spindle and power head to be displaced far enough to place the sanding disc 54 (refer to Figure 5) opposite the end of the worktable without modifying the machine. If it is not desirable to shift the beam 27 axially, it is possible to establish an initial position which will enable the spindle to be moved from the position shown in Figure 4 to that of Figure 3 with the normal feed adjustment of a drill press, with the axial location of the beam 27 remaining fixed with respect to the collar 31.

In Figures 5 and 6 a modification of the extension 47 is shown in which a vertical slot 55 is provided establishing a limited freedom of vertical movement of the bolt 48, in situations where it is undesirable to rotate the power head above the axis of the beam 27 to vary the position of the spindle with respect to the surface of the worktable. To place the machine in the attitude shown in Figures 5, 6, 7, 8, and 9, it is merely necessary to loosen the nut 39 and rotate the entire assembly based upon the beam 27 into the horizontal position. The nut 39 is then tightened to maintain the adjusted position. The bolt 33 may be loosened to permit rotation of the beam 27 to whatever position is desired for the installation of a saw blade, sanding disc, or boring tool within the chuck 24, followed by the placement of the spindle in the desired working position.

To place the unit in the attitude shown in Figure 8, it is necessary to merely rotate the beam 27 assembly 180° from the position shown in Figure 1. The routing cutter 56 may be provided with an extension 57 reaching through the opening 58 in the worktable in cases where the spindle assembly is not capable of sufficient extension through the use of the conventional drill press feed adjustment. It is preferable, however, to maintain the length of any extension 57 at a minimum to reduce vibration and eccentricity.

Referring to Figure 9, the horizontal position of the machine can also be utilized to provide the functions of a wood lathe by inserting a driving center 58 in the spindle assembly, and by providing a tailstock attachment 59 which is secured to the worktable 50 by any convenient fastenings. If desired, a conventional tool rest (not shown) may be mounted on the floor, on the vertical column 29, or on the beam 27, to provide a rest for the usual cutting tools.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:

1. A multi-purpose machine tool, comprising: a base member including a normally vertical column; a beam of uniform cross-section throughout its length and in its lowest vertical position substantially coextensive with said column having a power head mounted thereon, said power head having a spindle disposed on an axis parallel to said beam; a worktable having a mounting extension disposed at a distance from the plane of the surface of said worktable and normally under the same; a bracket adjustably mounted for movement along said beam; means forming a rotatable connection between said mounting extension and said bracket on an axis perpendicular to said beam; locking means for fixing the position of said worktable and said beam; means forming a pivot connection between said beam and said column on a normally horizontal axis disposed between said power head and said worktable, said pivot connection means including a collar rotatably and slideably receiving said beam, and including locking means for maintaining an adjusted position of said beam in said collar; and locking means for fixing the position of said beam with respect to said column.

2. A multi-purpose machine tool, comprising: a base member including a normally vertical column; a cylindrical beam substantially coextensive with said column in its lowest vertical position, having a power head mounted thereon, said power head having a spindle disposed on an axis parallel to said beam; a worktable having a mounting extension disposed at a distance from the plane of the surface of said worktable and normally under the same; a bracket adjustably mounted for movement along said beam; means forming a rotatable connection between said mounting extension and said bracket on an axis perpendicular to said beam; locking means for fixing the position of said worktable and said beam; means forming a pivot connection between said beam and said column on a normally horizontal axis disposed between said power head and said worktable, said pivot connection means including a collar rotatably receiving said beam, and including locking means for maintaining an adjusted angular position of said beam in said collar; and locking means for fixing the position of said beam with respect to said column.

3. A multi-purpose machine tool, comprising: a base member including a normally vertical column; a beam substantially coextensive with said column in its lowest vertical position, having a cylindrical outer surface, and having a power head mounted thereon, said power head having a spindle disposed on an axis parallel to said beam, said power head being rotatable about the axis of said beam; a worktable having a mounting extension disposed at a distance from the plane of the surface of said worktable and normally under the same; a bracket adjustably mounted for movement along and around said beam; means forming a rotatable connection between said mounting extension and said bracket on an axis perpendicular to said beam; locking means for fixing the position of said work table and said beam; means forming a pivot connection between said beam and said column on a normally horizontal axis disposed between said power head and said worktable; locking means for fixing the position of said beam with respect to said column.

4. A multi-purpose machine tool, comprising: a base member including a normally vertical column; a beam substantially coextensive with said column in its lowest vertical position, having a cylindrical outer surface, and having a power head mounted thereon, said power head having a spindle disposed on an axis parallel to said beam, said power head being rotatable about the axis of said beam; a worktable having a mounting extension disposed at a distance from the plane of the surface of said worktable and normally under the same; a bracket adjustably mounted on said beam for movement about the axis thereof; means forming a rotatable connection between said mounting extension and said bracket on an axis perpendicular to said beam; locking means for fixing the position of said worktable and said beam; means forming a pivot connection between said beam and said column on a normally horizontal axis; and locking means for fixing the position of said beam with respect to said column.

5. A multi-purpose machine tool, comprising: a base member including a normally vertical column; a beam of uniform cross-section throughout its length and in its lowest vertical position substantially coextensive with said column having a power head mounted thereon, said power head having a spindle disposed on an axis parallel to said beam; a worktable having a mounting extension disposed at a distance from the plane of the surface of said worktable and normally under the same; a bracket mounted for rotation with respect to said power head about the axis of said beam said bracket being adjustable along said beam; means forming a rotatable connection between said mounting extension and said bracket on an axis perpendicular to said beam; locking means for fixing the position of said worktable and said beam; means forming a pivot connection between said beam and said column on a normally horizontal axis, said means including a clamp engaging said beam between said power head and said bracket; and locking means for fixing the position of said beam with respect to said column.

6. A multi-purpose machine tool, comprising: supporting means including a normally vertical beam; a beam of uniform cross-section throughout its length and in its lowest vertical position substantially coextensive with said column having a power head mounted thereon, said power head having a spindle disposed on an axis parallel to said beam; a worktable mounted on said beam and rotatable with respect to said power head about the axis of said beam, and also rotatable with respect thereto on an axis perpendicular to said beam; locking means for fixing the position of said worktable and said beam; means forming a pivot connection between said beam and said supporting means on a normally horizontal axis, said power head being adjustable about the axis of and along said beam with respect to said pivot connection means; and locking means for fixing the position of said beam with respect to said supporting means.

7. A multi-purpose machine tool, comprising: a base member including a normally vertical column; a beam substantially coextensive with said column in its lowest vertical position, having a cylindrical outer surface, and having a power head mounted thereon, said power head being rotatable about the axis of said beam; a worktable having a mounting extension; a bracket on said beam; means forming a rotatable connection between said mounting extension and said bracket on an axis perpendicular to said beam; locking means for fixing the position of said worktable and said beam; means forming a pivot connection between said beam and said column on a normally horizontal axis; and locking means for fixing the position of said beam with respect to said column.

References Cited in the file of this patent

UNITED STATES PATENTS

| | | |
|---|---|---|
| 699,535 | Kelley | May 6, 1902 |
| 1,571,745 | Warner | Feb. 2, 1926 |
| 2,089,362 | Haas | Aug. 10, 1937 |
| 2,105,009 | Roebuck | Jan. 11, 1938 |
| 2,181,128 | Hack | Nov. 28, 1939 |
| 2,200,799 | Miller | May 14, 1940 |
| 2,623,269 | Goldschmidt | Dec. 30, 1952 |